United States Patent
Bailer et al.

(10) Patent No.: US 11,495,204 B2
(45) Date of Patent: Nov. 8, 2022

(54) LINING COMPONENT AND MOTOR VEHICLE

(71) Applicant: Bayerische Motoren Werke Aktiengesellschaft, Munich (DE)

(72) Inventors: Hans-Peter Bailer, Utting a. Ammersee (DE); Raphael Eltrop, Munich (DE); Peter Genender, Woerthsee (DE); Philipp Hofmann, Wiedenzhausen (DE); Barbara Schmidt, Munich (DE); Felix Schumacher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 392 days.

(21) Appl. No.: 16/818,545

(22) Filed: Mar. 13, 2020

(65) Prior Publication Data
US 2020/0219476 A1   Jul. 9, 2020

Related U.S. Application Data

(63) Continuation of application No. PCT/EP2018/074440, filed on Sep. 11, 2018.

(30) Foreign Application Priority Data

Sep. 14, 2017 (DE) .................... 10 2017 216 254.6

(51) Int. Cl.
*G10K 11/172* (2006.01)
*B60H 1/00* (2006.01)
*B60R 13/08* (2006.01)

(52) U.S. Cl.
CPC ....... *G10K 11/172* (2013.01); *B60H 1/00271* (2013.01); *B60H 1/00295* (2019.05); *B60H 1/00564* (2013.01); *B60R 13/0815* (2013.01)

(58) Field of Classification Search
CPC ............. G10K 11/172; B60R 13/0815; B60H 1/00295; B60H 1/00564; B60H 1/00271
See application file for complete search history.

(56) References Cited

U.S. PATENT DOCUMENTS

2002/0041116 A1* 4/2002 Bogisch ............... B60N 2/5671
                                                                     297/180.1
2004/0173175 A1   9/2004 Kostun et al.
(Continued)

FOREIGN PATENT DOCUMENTS

DE         43 05 395 C1    1/1994
DE    10 2004 007 717 A1    9/2004
(Continued)

OTHER PUBLICATIONS

International Search Report (PCT/ISA/210) issued in PCT Application No. PCT/EP2018/074440 dated Dec. 20, 2018 with English translation (six pages).

(Continued)

*Primary Examiner* — Lori L Lyjak
(74) *Attorney, Agent, or Firm* — Crowell & Moring LLP

(57) ABSTRACT

A lining component for lining a passenger cell of a motor vehicle is multifunctional. The lining component has at least one acoustic resonator which is open towards the passenger cell and/or at least a fluid chamber through which a temperature control medium is flowable.

8 Claims, 1 Drawing Sheet

(56) References Cited

U.S. PATENT DOCUMENTS

| | | | |
|---|---|---|---|
| 2005/0136100 A1* | 6/2005 | Foss | B32B 27/28 |
| | | | 424/443 |
| 2007/0034447 A1 | 2/2007 | Proscia et al. | |
| 2007/0035162 A1 | 2/2007 | Bier et al. | |
| 2009/0217608 A1* | 9/2009 | Braun | B60H 1/245 |
| | | | 52/302.1 |
| 2016/0221611 A1 | 8/2016 | Wolf et al. | |
| 2019/0023869 A1* | 1/2019 | Wegman | C08K 5/1535 |

FOREIGN PATENT DOCUMENTS

| | | | | |
|---|---|---|---|---|
| DE | 10 2009 006 621 A1 | 8/2009 | | |
| DE | 10 2007 062 898 A1 | 9/2009 | | |
| DE | 10 2010 047 907 A1 | 4/2012 | | |
| DE | 10 2012 010 892 A1 | 12/2013 | | |
| DE | 11 2015 000 862 T5 | 11/2016 | | |
| DE | 102018115498 A1 * | 1/2019 | | B60R 11/04 |
| EP | 1 454 790 A1 | 9/2004 | | |
| EP | 3 213 906 A1 | 9/2017 | | |
| FR | 2 878 221 A1 | 5/2006 | | |
| WO | WO 2015/044076 A1 | 4/2015 | | |

OTHER PUBLICATIONS

German-language Written Opinion (PCT/ISA/237) issued in PCT Application No. PCT/EP2018/074440 dated Dec. 20, 2018 (five pages).

German-language Search Report issued in German Application No. 10 2017 216 254.6 dated Sep. 20, 2018 with partial English translation (13 pages).

* cited by examiner

LINING COMPONENT AND MOTOR VEHICLE

CROSS REFERENCE TO RELATED APPLICATIONS

This application is a continuation of PCT International Application No. PCT/EP2018/074440, filed Sep. 11, 2018, which claims priority under 35 U.S.C. § 119 from German Patent Application No. 10 2017 216 254.6, filed Sep. 14, 2017, the entire disclosures of which are herein expressly incorporated by reference.

BACKGROUND AND SUMMARY OF THE INVENTION

The invention relates to a lining component for lining a passenger cell of a motor vehicle and to a motor vehicle having a passenger cell and a passenger cell lining which partially lines the passenger cell.

A passenger cell of a motor vehicle is lined with various lining components, such as a dashboard or an instrument panel, for example. The lining components are customarily strictly arranged separately according to their respective function and the respectively available installation space. For example, the instrument panel has openings for ventilation let into it and on each of which there is arranged a grille for directing an air flow exiting from the respective opening. The geometric freedom in terms of the design of the instrument panel is greatly influenced by the arrangement of the openings and the grilles on the instrument panel.

Furthermore, all the surfaces of the lining components have the disadvantage that they are extremely heated during summer by solar radiation and strongly cooled during winter. As a result, undesired temperature peaks occur on the lining components.

Moreover, from an acoustic point of view, closed surfaces of lining components and windows are disadvantageous since they reflect sound, which has a disadvantageous impact on the internal noise in the passenger cell.

DE 10 2004 007 717 A1 concerns a Helmholtz resonator with variable tuning that is used for damping undesired frequencies of the noise of an air guide in a motor vehicle. The resonator comprises a housing with a chamber formed therein and with a plurality of neck pieces through which a fluid can communicate between the chamber and an air guide, wherein each of the neck pieces has a different neck length. Furthermore, the resonator comprises a solenoid valve which is arranged in each of the neck pieces, wherein these solenoid valves are configured to be selectively opened or closed, and wherein the opening and closing of the solenoid valves allows the selection of a desired neck length. Moreover, the resonator comprises a sensor for the speed of the engine that is configured to detect the speed of the engine. Furthermore, the resonator comprises a programmable control unit which is connected to the sensor and which is configured to control the opening and the closing of the solenoid valves in dependence on the speed of the engine that is detected by the sensor. The choice of a desired neck length tunes the damping of a desired frequency of the noise in the air guide.

DE 43 05 395 C1 concerns a device for removing heat from the components particularly exposed to solar radiation, in particular an instrument panel and a parcel shelf, in motor vehicles with an air-conditioning unit which has at least one evaporator. On the underside of the component that faces away from the solar radiation there is arranged a large-area radiator consisting of good heat-conducting material and connected via at least one heat bridge to the outer shell of the evaporator of the air-conditioning unit.

An object of the invention is to provide a multifunctional lining component for a passenger cell of a motor vehicle by means of which the above-described advantages are avoided.

A lining component according to the invention for lining a passenger cell of a motor vehicle comprises at least one acoustic resonator which is open toward the passenger cell and/or at least one fluid chamber through which a temperature-control medium can flow. Here, embodiments of the lining component can correspond to embodiments of the motor vehicle, and vice versa, even if there is no explicit reference below thereto in the individual case.

The acoustic resonator of the lining component according to the invention makes it possible for at least one frequency in the noise or the sound within the passenger cell to be partially or completely absorbed. For this purpose, the resonator is designed to be open toward the passenger cell or communicatively connected to the passenger cell. In particular, the resonator can be designed in such a way that it allows broadband sound absorption of undesired frequencies. The resonator can be referred to as a Helmholtz resonator. Certain sound frequencies can be damped in a targeted manner via the respective design of the resonator volume, the opening cross section of the resonator opening and a neck length of a resonator neck of the resonator that connects the resonator volume to the resonator opening. The targeted damping of the undesired sound frequencies or the targeted filtering of different frequency bandwidths of the sound in the passenger cell gives rise to a modified background noise in the passenger cell, with the result that the background noise and/or the loudness of the sound are/is reduced. In this way, a correspondingly equipped motor vehicle is perceived to be more comfortable by vehicle occupants. The lining component can also have two or more corresponding resonators.

If the lining component alternatively or additionally comprises the fluid chamber and if the gaseous or liquid temperature-control medium is channeled through the fluid chamber of the lining component according to the invention, the lining component is temperature-controlled as a result, that is to say either cooled or heated. It is particularly thereby possible for the surface of the lining component that faces the passenger cell to be temperature-controlled. This means, for example, that intense heating of the lining component upon solar radiation can be prevented. Therefore, the occurrence of undesired temperature peaks on the lining component can be prevented. The lining component can also have two or more corresponding fluid chambers which are separated from one another or communicatively connected to one another.

Depending on the embodiment, the lining component according to the invention can thus either, on the one hand, bring about sound absorption or temperature control of the lining component or, on the other hand, bring about sound absorption and temperature control of the lining component. According to one embodiment, these two functions can thus be performed by a single lining component. As a result, the comfort of a correspondingly equipped motor vehicle is increased overall. This is occasioned by the reduced acoustic load on vehicle occupants and the temperature control of the lining component or the temperature control of its surface facing the passenger cell.

According to an advantageous embodiment, a resonator space of the resonator is arranged on a side of the fluid chamber that faces away from the passenger cell, wherein at least one duct communicatively connected to the resonator space penetrates through the fluid chamber and opens in a resonator opening at a front side of the lining component that faces the passenger cell. Accordingly, the fluid chamber is arranged directly adjacent to a wall of the lining component that forms the front side of the lining component, thereby entailing an excellent temperature control of this surface or wall. The duct communicatively connecting the passenger cell to the resonator space forms a resonator neck whose neck length is adapted to the respective application. The size of the resonator space is preferably likewise adapted to the respective application in order to achieve a desired sound absorption. Two or more corresponding ducts can also be communicatively connected to the resonator space.

A further advantageous embodiment provides that the lining component has at least one air duct which penetrates through the lining component, is open toward the passenger cell, is formed in a rectilinear or at least partially curved manner and penetrates through the lining component from a rear side of the lining component that faces away from the passenger cell to a front side of the lining component that faces the passenger cell. A rectilinearly formed air duct can extend perpendicularly to the front side of the lining component or in some other way transversely or obliquely to the front side. The air duct penetrating through the lining component additionally allows ventilation or air-conditioning of the passenger cell to occur. For this purpose, the air duct is designed to be open toward the passenger cell or communicatively connected to the passenger cell. The air duct can be formed in such a way that it allows indirect source-air ventilation or directed indirect ventilation. Here, the air duct has a cross-sectional area which is considerably smaller than a cross-sectional area of a conventional ventilation duct which opens in a ventilation opening on which there is arranged a grille for directing the air flow exiting from the ventilation opening. Consequently, the freedom in terms of the design of the lining component according to the invention is as far as possible not influenced by the arrangement of the air duct. The air duct can be communicatively connected to a ventilation and/or air-conditioning unit of the motor vehicle in order to be able to carry out desired ventilation or air-conditioning of the passenger cell.

The lining component can also have two or more corresponding air ducts. According to this embodiment, the lining component additionally serves for ventilating and/or air-conditioning the passenger cell without some other component having to be installed for this purpose.

According to a further advantageous embodiment, the lining component is formed in one piece. As a result, the lining component can have a compact design, with the result that installation space can be saved. In addition, the lining component formed in one piece or monolithically is very robust and thus durable.

The lining component is advantageously produced by an additive manufacturing method. As a result, the lining component can also be formed in one piece with a complex structure in a simple manner. In addition, the additive manufacturing method allows production costs to be saved, and the manufacturability of the lining component is generally ensured. Furthermore, the configuration of the geometry of the lining component is subject to fewer conditions than in the case of a conventional manufacture of a lining component. The front side or the wall of the lining component that forms it can be manufactured in a self-supporting manner.

A motor vehicle according to the invention comprises a passenger cell and a passenger cell lining which partially lines the passenger cell, wherein the passenger cell lining has at least one lining component according to one of the aforementioned embodiments or any desired combination of at least two of these embodiments with one another.

The advantages stated above with respect to the lining component are correspondingly associated with the motor vehicle. The motor vehicle can be, for example, a passenger car, a transporter or a truck. The motor vehicle can also have two or more corresponding lining components which form, for example, an instrument panel, a door cladding or the like.

According to an advantageous embodiment, the motor vehicle comprises at least one ventilation and/or air-conditioning unit which is communicatively connected to the air duct of the lining component and intended for ventilating the passenger cell. The ventilation and/or air-conditioning unit supplies the air duct, and hence the passenger cell, with an air flow for ventilating or air-conditioning the passenger cell. The ventilation and/or air-conditioning unit can supply the air duct with the air flow in dependence on a detected internal temperature in the passenger cell.

According to a further advantageous embodiment, the motor vehicle comprises at least one device which is communicatively connected to the fluid chamber of the lining component and intended for supplying the fluid chamber with the temperature-control medium. The device can supply the fluid chamber with a gaseous or liquid temperature-control medium. The device can be activated and/or controlled and/or regulated in dependence on signals of at least one sensor, for example of a temperature sensor detecting the temperature within the passenger cell, of a temperature sensor which is arranged on a lining component and detects the surface temperature of the lining component, of a brightness sensor for detecting the solar radiation acting on the motor vehicle or the like.

Other objects, advantages and novel features of the present invention will become apparent from the following detailed description of one or more preferred embodiments when considered in conjunction with the accompanying drawing.

DETAILED DESCRIPTION OF THE DRAWING

Figure 1:
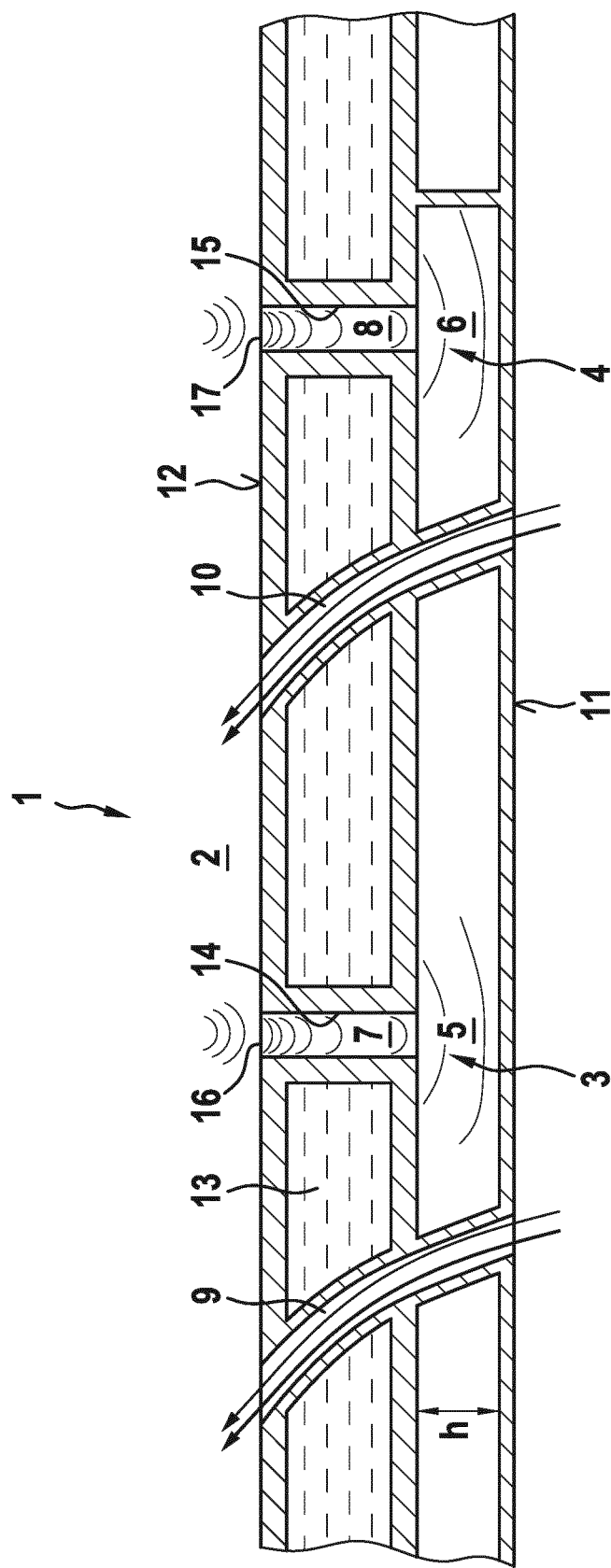
FIG. 1 is a schematic sectional illustration of an exemplary embodiment of a lining component according to the invention.

FIG. 1 shows a schematic sectional illustration of an exemplary embodiment of a lining component 1 for lining a passenger cell 2 of a motor vehicle (not shown). The lining component 1 is produced in one piece by an additive manufacturing method.

The lining component 1 comprises two acoustic resonators 3 and 4 which are open toward the passenger cell 2 and which can be separated from one another or communicatively connected to one another. A height h of the resonators 3 and 4 is adapted to the respectively desired sound absorption. Each resonator 3 or 4 comprises a resonator space 5 or 6 and a resonator neck 7 or 8.

Furthermore, the lining component 1 comprises two air ducts 9 and 10 which penetrate through the lining component 1 and are open toward the passenger cell 2. Each air duct 9 or 10 is of curved design and penetrates through the lining component 1 from a rear side 11 of the lining component 1 that faces away from the passenger cell 2 to a front side 12 of the lining component 1 that faces the passenger cell 2. The air ducts 9 and 10 can be communicatively connected to a ventilation and/or air-conditioning unit (not shown) of the motor vehicle in order to ventilate the passenger cell 2.

In addition, the lining component 1 comprises a fluid chamber 13 through which a temperature-control medium (not shown) can flow. The fluid chamber 13 can be communicatively connected to a vehicle-specific device (not shown) for supplying the fluid chamber 13 with the temperature-control medium.

The resonator space 5 or 6 of the respective resonator 3 or 4 is arranged on a side of the fluid chamber 13 that faces away from the passenger cell 2. A duct 14 or 15 which is communicatively connected to the respective resonator space 5 or 6 penetrates through the fluid chamber 13 and opens in a resonator opening 16 or 17 at the front side 12 of the lining component 1 that faces the passenger cell 2. Each duct 14 or 15 forms a resonator neck 7 or 8.

LIST OF REFERENCE SIGNS

1 Lining component
2 Passenger cell
3 Resonator
4 Resonator
5 Resonator space of 3
6 Resonator space of 4
7 Resonator neck of 3
8 Resonator neck of 4
9 Air duct
10 Air duct
11 Rear side of 1
12 Front side of 1
13 Fluid chamber
14 Duct
15 Duct
16 Resonator opening of 3
17 Resonator opening of 4
h Height of 5, 6

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component for a passenger cell of a motor vehicle, comprising:
   a lining component configured to line the passenger cell, the lining component comprising one or both of:
   at least one acoustic resonator which is open toward the passenger cell, and
   at least one fluid chamber through which a temperature-control medium is flowable, wherein
   a resonator space of the resonator is arranged on a side of the fluid chamber that faces away from the passenger cell, and
   at least one duct communicatively connected to the resonator space penetrates through the fluid chamber and opens into a resonator opening at a front side of the lining component that faces the passenger cell.

2. The component according to claim 1, wherein
   at least one air duct open toward the passenger cell is formed in a rectilinear or at least partially curved manner and penetrates through the lining component from a rear side of the lining component that faces away from the passenger cell to a front side of the lining component that faces the passenger cell.

3. A component for a passenger cell of a motor vehicle, comprising:
   a lining component configured to line the passenger cell, the lining component comprising one or both of:
   at least one acoustic resonator which is open toward the passenger cell, and
   at least one fluid chamber through which a temperature-control medium is flowable, wherein
   the lining component is formed in one piece.

4. The component according to claim 3, wherein the lining component is an additive manufactured lining component.

5. A motor vehicle comprising:
   a passenger cell; and
   a passenger cell lining which partially lines the passenger cell, wherein
   the passenger cell lining has at least one component according to claim 1.

6. The motor vehicle according to claim 5, further comprising:
   at least one ventilation and/or air-conditioning unit which is communicatively connected to the air duct of the lining component for ventilating the passenger cell.

7. The motor vehicle according to claim 6, further comprising:
   at least one fluid supply device which is communicatively connected to the fluid chamber of the lining component for supplying the fluid chamber with the temperature-control medium.

8. The motor vehicle according to claim 5, further comprising:
   at least one fluid supply device which is communicatively connected to the fluid chamber of the lining component for supplying the fluid chamber with the temperature-control medium.

* * * * *